United States Patent [19]

Martinez

[11] 4,344,231
[45] Aug. 17, 1982

[54] AREA MAPPING APPARATUS
[76] Inventor: Donald G. Martinez, P.O. Box 584, Calistoga, Calif. 94515
[21] Appl. No.: 245,415
[22] Filed: Mar. 19, 1981
[51] Int. Cl.³ .............................................. G01B 3/02
[52] U.S. Cl. ...................................... 33/1 G; 33/138; 33/494
[58] Field of Search ................ 33/137, 138, 139, 483, 33/494, 471, 430, 23 B, 1 G

[56]  References Cited
U.S. PATENT DOCUMENTS 1,810,392  6/1931  Clark ..................................... 33/483
2,692,437  10/1954  Cook ..................................... 33/138

FOREIGN PATENT DOCUMENTS 590101  3/1925  France ................................... 33/494
1088520  9/1954  France ................................... 33/494

Primary Examiner—Harry N. Haroian
Attorney, Agent, or Firm—Townsend and Townsend

[57]   ABSTRACT

Apparatus for mapping the outline of a surface area, such as a golf green, including a board having depending legs for placement on the green and a centrally mounted pivot peg extending upwardly from the top of the board. A sheet of paper is attached to the top of the board and typically surrounds the pivot peg. A dual segment measuring element includes an inner, rigid, proportional measuring segment and an outer, flexible, full-scale measuring segment. The inner measuring segment has a pivot hole for engagement around the pivot peg. The inner and outer measuring segments both have their respective zero-points of their scales coincident with the pivot hole. Full-scale measurements are transferred to the paper at corresponding points along the inner, proportional measuring segment.

3 Claims, 4 Drawing Figures

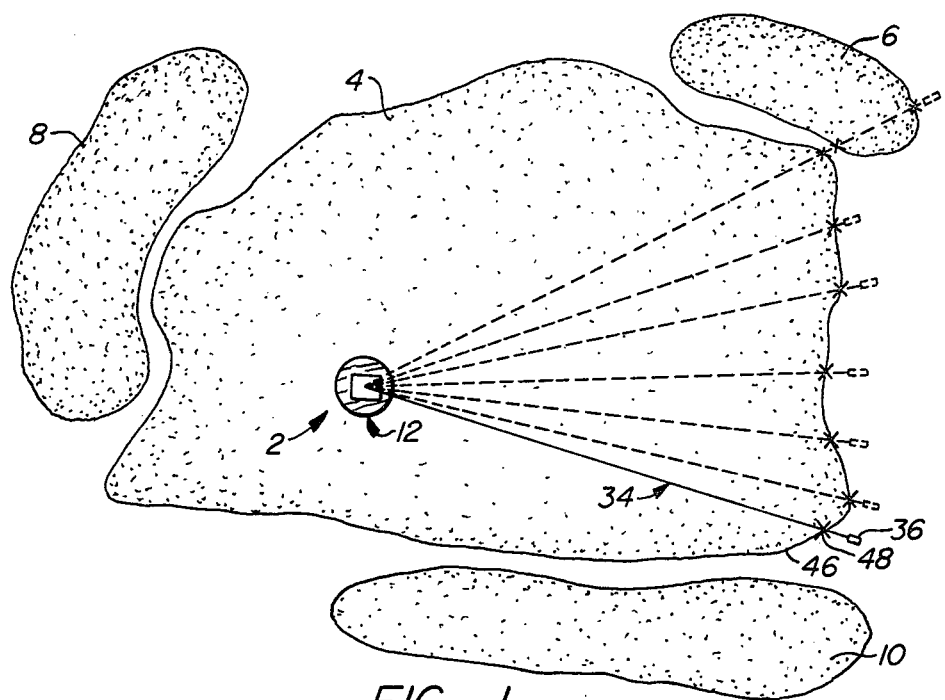
FIG._1.
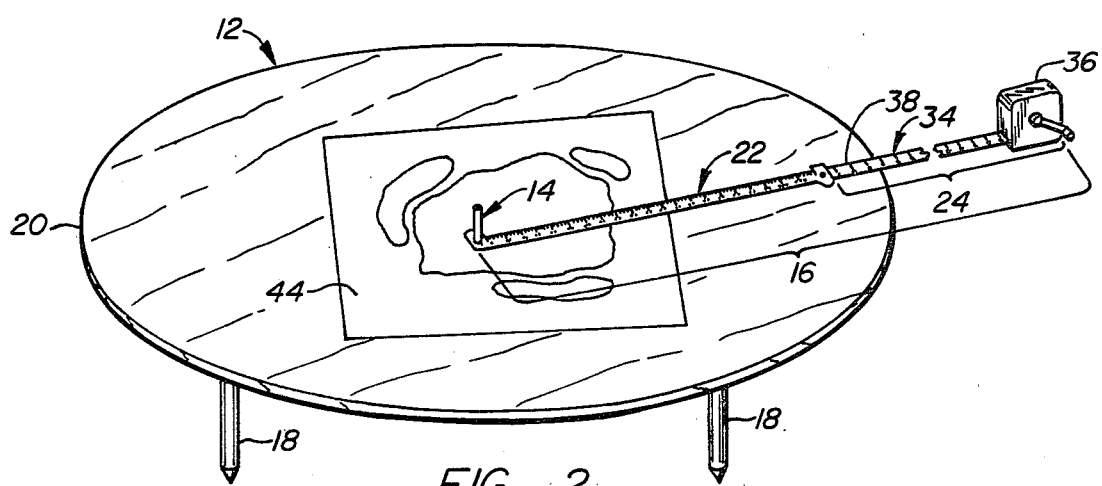
FIG._2.
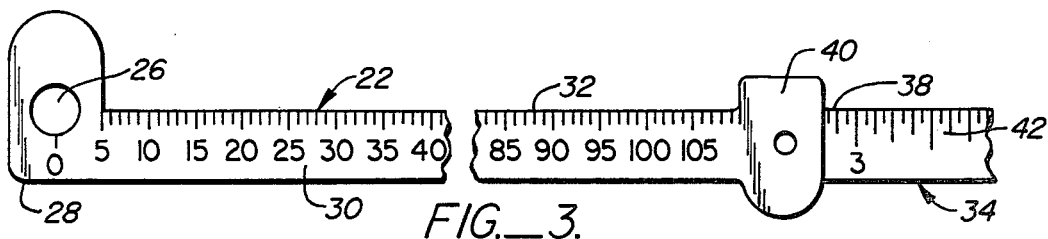
FIG._3.
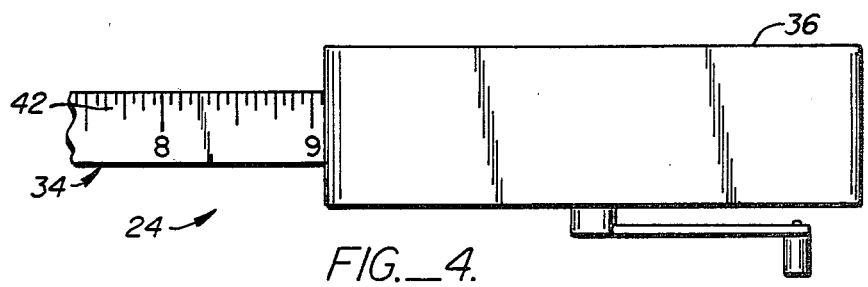
FIG._4.

1

AREA MAPPING APPARATUS

BACKGROUND OF THE INVENTION

Ever since man has been making scaled representations of physical things, proportional scales of various types have been found useful. One of the simplest types of proportional scales are the well known triangular architects' and engineers' scales. Another type of proportional scale is shown in U.S. Pat. No. 1,810,392 to Clark.

In order to ease the often tedious job of mapping land surface contours and boundaries, various types of automatic surface mapping machines have been developed. These machines typically are used to outline horizontal boundaries, map vertical contours, or both, at reduced scales; see, for example, U.S. Pat. No. 1,441,153 to Jefferson; U.S. Pat. No. 1,643,604 to Gast; and U.S. Pat. No. 1,920,633 to Dannenberg et al. One drawback with these automatic mapping machines is their mechanical complexity. This complexity increases the cost to the user thus making the prior art machines economically unavailable for use by persons for whom the need exists but who cannot justify or afford the cost of such complicated mapping machines.

Therefore, what has been missing from the prior art is a simple, inexpensive apparatus by which the general horizontal outline or boundary of a land surface area, such as a green on a golf course, can be mapped onto a sheet of paper.

SUMMARY OF THE INVENTION

The present invention provides a simple, inexpensive apparatus by which a user can map the outline of a surface area, such as a golf course green, onto a piece of paper.

The apparatus includes a board having three legs for placement on the golf course green. The board has a centrally mounted pivot peg extending upwardly from the top of the board. A sheet of drawing paper is attached to the board, typically surrounding the pivot peg.

A dual segment measuring element includes an inner, relatively rigid, proportional measuring segment and an outer, flexible, full-scale measuring segment. The outer measuring segment is typically a flexible tape attached to the outer end of the inner measuring segment. The inner measuring segment has a pivot hole at its inner end for pivotal engagement around the pivot peg.

The outer measuring segment has a full-scale measurement scale marked thereon and has its zero-point at the center of the pivot hole. The inner measuring segment has a greatly reduced, proportional scale marked thereon and has its zero-point coincident with the zero-point of the outer measuring segment scale, that is at the center of the pivot hole.

A primary advantage of the present invention is its inherent simplicity. No complicated gear trains or pulley arrangements, known to the prior art, are needed so the cost of the apparatus can be kept low. Therefore one with a need for producing scaled maps of areas, such as greens on a golf course, can afford a mapping apparatus made according to the present invention. Further, no extensive training is needed for its use. Thus, what is provided by the apparatus of the invention is an affordable, simple mapping device particularly suited for measuring golf course greens.

Other features and advantages will become apparent from the following description in which the preferred embodiment has been set forth in detail in conjunction with the accompanying drawing.

BRIEF DESCRIPTION OF THE DRAWING

FIG. 1 is a plan or overhead view of a green on a golf course showing the apparatus of the present invention placed on the green.

FIG. 2 is a perspective view of the apparatus of FIG. 1 showing a sheet of paper on the top of the board having a reduced scale map of the green and sand traps of FIG. 1 plotted thereon.

FIG. 3 is an enlarged view of the inner proportional measuring segment.

FIG. 4 is an enlarged view of the tape reel for storing the flexible tape.

DETAILED DESCRIPTION OF THE PREFERRED EMBODIMENT

FIG. 1 shows the apparatus 2 of the present invention mounted on a green 4, the green surrounded by sand traps 6, 8 and 10. With reference also to FIG. 2, the apparatus includes generally a board 12, a pivot peg 14 and a dual segment measuring element 16.

Board 12 is circular and has three depending legs 18 evenly spaced about the center of the board and located near the periphery 20 of the board. Pivot peg 14 is cylindrical and is mounted at the center of the board and extends upwardly therefrom. Measuring element 16 includes an inner proportional measuring segment 22 and an outer full scale measuring segment 34.

Segment 22, shown best in FIG. 3, is a rigid member having a pivot hole 26 at its inner end 28. Pivot hole 26 is slightly larger than pivot peg 14 so the center of hole 26 is generally coincident with the axis of peg 14. Segment 22 includes a proportional scale 30 having its zero-point coincident with the center of pivot hole 26. The measuring edge 32 of segment 22 is aligned with the center of hole 26.

Outer measuring segment 34, as seen in FIG. 4, includes a tape 38 and a tape reel 36. The tape is flexible and is wound up into reel 36 in conventional fashion. The inner end of tape 38 is attached to the outer end 40 of measuring segment 22. Tape 38 has a full scale measurement scale 42 imprinted thereon. Scale 42 has its zero-point coincident with the zero-point of proportional scale 30 and thus coincident with the center of hole 26. This assures an accurate mapping of the outline of a surface area, such as the edge 46 of green 4, onto a sheet 44 of drawing material, typically graph paper. The use of appropriately scaled graph paper allows the area of the green to be quickly determined. The proper quantity of fertilizer, or other chemicals to be used on the green, can thus be easily and accurately determined.

The use of the apparatus of the present invention will now be described briefly. The user places board 12 on green 4 in a suitable location, typically somewhat centrally located on the green. If desired the board can be located externally of the area to be mapped, e.g., to one side of the green, however the length of tape 38 needed will increase. Legs 18 are somewhat pointed so that board 12 is securely positioned in place on green 4. A sheet 44 of graph paper is attached to the top of board 12, typically by thumb tacks or tape. Because the board is situated within the boundary to be mapped, sheet 44 has a hole so that it fits over pivot peg 14. An assistant then pays out tape 34 from tape reel 36 until the edge 46 of green 4 is reached. Pulling measuring element 16 somewhat taut, to assure an accurate reading in distance and rotary position, the assistant reads off the distance from measurement scale 42 on tape 34 where the tape crosses the edge 46 of the green. This point is indicated in FIG. 1 by an "x" 48. This distance is transferred to sheet 44 at the corresponding point on proportional scale 30 by the user. Measuring element 16 is then indexed about pivot peg 14 an appropriate distance and a new measurement is called out by the assistant to the user. This process is repeated as often as necessary to achieve the desired degree of resolution. These subsequent steps are indicated by dashed lines in FIG. 1. If desired, the edges of sand traps 6, 8 and 10 can be mapped onto sheet 44 by extending tape 38 past the boundaries of the sand traps and calling off their locations to the user as well as the location of edge 46 of green 4.

Modification variation can be made to the disclosed embodiment without departing from the subject of the invention as defined in the following claims.

I claim:

1. Apparatus for mapping a portion, such as the green, of a land surface area, such as a golf course, onto a sheet of paper comprising:

a generally planar board having a bottom and a top and having a plurality of depending supports attached to said bottom, said supports located about the center of said board near the periphery thereof and configured to provide stable support for said board on said land surface area;

a unitary, extendible measuring element including an inner, realtively stiff, proportional measuring segment and an outer, full scale, flexible tape measuring segment, said inner measuring segment attached at its outer end to an inner end of said flexible measuring segment providing a common measurement axis for said measuring segments of said measuring element when said measuring element is pulled taut during use, said inner measuring segment having a pivot point at is inner end, said inner and outer measuring segments having respective distance scales marked thereon, said distance scales having generally coincident zero points at the pivot point of said inner measuring segments; and means for pivotally attaching said inner measuring segment at said pivot point thereof to a central portion of said top for movement of said inner and outer measuring segments about said pivot point in a plane generally parallel with said top;

whereby the outline of the surface area portion can be mapped onto the sheet of paper mounted to the board by transferring actual surface measurements from said outer full-scale measuring segment to the paper at a reduced scale using said inner, proportional measuring segment.

2. The mapping apparatus of claim 1 wherein said supports are legs, having pointed lower ends for penetration into a yieldable turf surface.

3. The mapping apparatus of claim 1 wherein said common measurement axis is defined by colinear measurement edges along said measuring segments aligned with said pivot point.

* * * * *